United States Patent [19]

Sato

[11] Patent Number: 4,686,585
[45] Date of Patent: Aug. 11, 1987

[54] VTR HAVING AUTOMATIC CARRIER DETECTION

[75] Inventor: Ichitaro Sato, Kanagawa, Japan

[73] Assignee: Sony Corporation, Tokyo, Japan

[21] Appl. No.: 700,732

[22] Filed: Feb. 11, 1985

[30] Foreign Application Priority Data

Feb. 13, 1984 [JP] Japan .................................. 59-24749

[51] Int. Cl.⁴ ........................ H04N 5/78; H04N 9/491
[52] U.S. Cl. .................................. 360/33.1; 358/310; 360/27
[58] Field of Search ............... 360/27, 33.1, 330, 14.1; 558/310, 319, 21 R

[56] References Cited

U.S. PATENT DOCUMENTS 3,586,769  6/1971  Luther, Jr. ............................. 360/29
3,809,804  5/1974  Okuno et al. ....................... 360/27 X

FOREIGN PATENT DOCUMENTS 2091022  7/1982  United Kingdom .................. 360/27

Primary Examiner—Aristotelis M. Psitos
Attorney, Agent, or Firm—Lewis H. Eslinger; Alvin Sinderbrand

[57] ABSTRACT

An apparatus for reproducing from a magnetic tape first and second video signals which are frequency modulated on a carrier, the first video signal having the center frequency of the carrier lower than that of the second video signal is disclosed, which includes a demodulator for demodulating the first and second video signals, a first low-pass filter coupled to the demodulator for filtering the first and second video signals demodulated by the demodulator, the first low-pass filter having a first cut-off frequency, a second low-pass filter coupled to the demodulator for filtering the first and second video signals demodulated by the demodulator, the second low-pass filter having a second cut-off frequency which is lower than the first cut-off frequency, a detector connected prior to the demodulator for detecting whether a reproduced video signal is the first or second video signal and for generating a control signal in response thereto and a switching circuit for selectively supplying the output signal of the first and second low-pass filters to an output terminal in accordance with the control signal from the detector.

12 Claims, 21 Drawing Figures

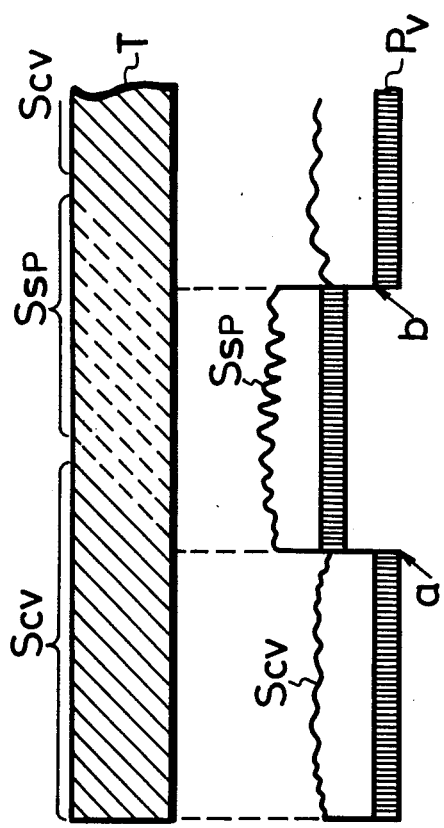
FIG. 12A
FIG. 12B
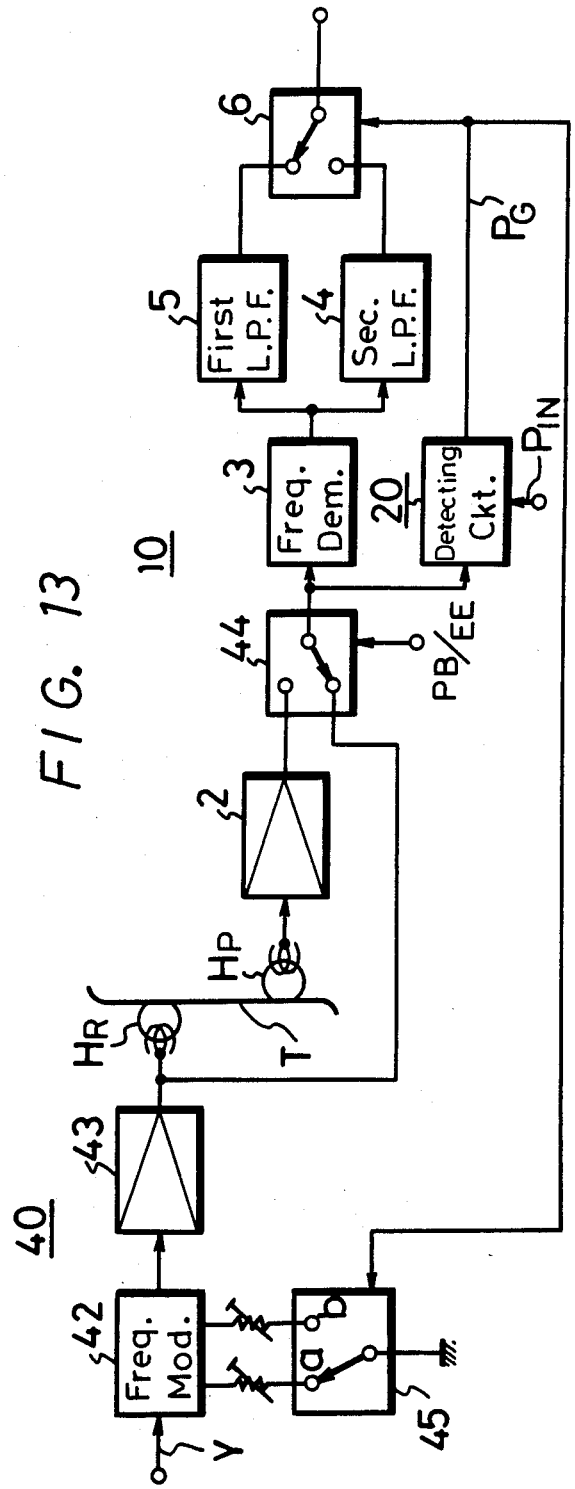
FIG. 13

VTR HAVING AUTOMATIC CARRIER DETECTION

BACKGROUND OF THE INVENTION

1. Field of the Invention

This invention relates to a video tape recorder (VTR) and in particular, is directed to a VTR suitable for use with a so-called low frequency-converted signal recording and/or reproducing system in which a chrominance subcarrier signal is low frequency-converted, recorded on a recording tape together with a frequency modulated luminance signal and reproduced therefrom.

2. Description of the Prior Art

In an apparatus for recording and/or reproducing a low frequency-converted carrier signal in which a low frequency-converted carrier chrominance signal $S_C$ is recorded on a recording tape together with a frequency modulated luminance signal $S_Y$, the deviation range of the frequency-modulated frequency is occasionally made different from that of the existing one in use.

FIG. 1A shows a frequency spectrum of an existing low frequency-converted color video signal $S_{CV}$ in a case where the deviation width of the frequency-modulated frequency is selected in a range from 3.8 MHz to 5.4 MHz and the low frequency-converted frequency fc is selected as, for example, 688 KHz (in the case of NTSC system), while FIG. 1B shows a frequency spectrum of a low frequency-converted color video signal $S_{SP}$ in a case where the deviation frequency is selected higher than the afore-said frequency by 1.0 MHz.

When the first and second color video signals $S_{CV}$ and $S_{SP}$ which are the same in frequency-modulated deviation width but different in deviation frequency and are recorded on the same tape T in the mixed state as, for example, shown in FIG. 2 are reproduced or when a video information is reproduced not from a tape on which only the first color video signal $S_{CV}$ is recorded but from a magnetic tape on which only the second color video signal $S_{SP}$ is recorded, the reproducing system of a VTR must selectively change over a circuit constant such as a cut-off frequency of a low-pass filter used in, for example, a frequency demodulator in accordance with the color video signals $S_{CV}$ and $S_{SP}$ to be reproduced.

For such case, it is considered to form the reproducing system of the VTR as shown in FIG. 3.

FIG. 3 illustrates a reproducing system 10 for only a luminance signal system. As shown in FIG. 3, a first or second color video signal $S_{CV}$ or $S_{SP}$ reproduced by a magnetic reproducing head $H_P$ from a magnetic tape T is supplied through a preamplified 2 to a frequency demodulator 3 in which a luminance signal $Y_{CV}$ or $Y_{SP}$ is demodulated, which then is fed to a second low-pass filter 4, in which the band of the luminance signal $Y_{CV}$ or $Y_{SP}$ is restricted by a predetermined amount.

For example, when the filter characteristic suitable for the first luminance signal $Y_{CV}$ is selected as shown by F1 n FIG. 4, the filter characteristic suitable for the second luminance signal $Y_{SP}$ is selected as shown by F2 which is extended as compared with F1 in high frequency region so that the filter characteristic of the second low-pass filter 4 is selected as F2.

A first low-pass filter 5 having a filter characteristic F1 is connected at the post stage of the second low-pass filter 4 and a switching circuit 6 is provided for selectively supplying the outputs from these low-pass filters 4 and 5 to an output terminal thereof. The switching circuit 6 is changed over such that only when the first luminance signal $Y_{CV}$ is demodulated, the output from the first low-pass filter 5 is delivered from the switching circuit 6.

To this end, the first or second luminance signal $Y_{CV}$ or $Y_{SP}$ thus demodulated is supplied to a synchronizing signal separating circuit 7 in which each of horizontal synchronizing signal $P_{HC}$ and $P_{HS}$ is respectively separated from the first and second luminance signal $Y_{CV}$ or $Y_{SP}$ to thereby form a gate pulse $P_G$, by which the horizontal synchronizing pulse $P_{HC}$ or $P_{HS}$ of the first or second luminance signal $Y_{CV}$ or $Y_{SP}$ is gated. Reference numeral 8 designates a gate circuit therefor.

When the input and output characteristic of the frequency demodulator 3 is selected as shown by a straight line 1 in FIG. 5, the horizontal synchronizing pulses $P_{HC}$ and $P_{HS}$ of the frequency-demodulated first and second luminance signals $Y_{CV}$ and $Y_{SP}$ are different in DC level. This level difference is used to discriminate the first and second color video signals $S_{CV}$ and $S_{SP}$ from each other. To this end, the gate horizontal synchronizing pulses $P_{HC}$ and $P_{HS}$ from the gate circuit 8 are supplied to a level comparator 9 in which the DC levels thereof are respectively compared with a reference level so as to produce a compared output $P_C$ of "H" (high level) for, for example, the horizontal synchronizing pulse $P_{HC}$ and the compared output $P_C$ of "L" (low level) for the horizontal synchronizing pulse $P_{HS}$.

The switching circuit 6 is controlled by the compared output pulse $P_C$ such that when the first color video signal $S_{CV}$ is reproduced, the output from the first low-pass filter 5 is always delivered therefrom while when the second color video signal $S_{SP}$ is reproduced, the output from the second low-pass filter 4 is always delivered therefrom.

When the gate pulse $P_G$ is formed from the demodulated first or second color video signal $S_{CV}$ or $S_{SP}$, upon reproducing, if a dropout occurs, the horizontal synchronizing pulses $P_{HC}$ and $P_{HS}$ used for forming the gate pulse $P_G$ can not be synchronously separated positively. As a result, the low-pass filters 4 and 5 can not be changed over precisely.

Further, when a noise SN as shown in FIG. 6 enters the video signal, the synchronizing separating circuit 7 is mal-functioned by the noise SN so that also in this case, the low-pass filters 4 and 5 can not be changed over accurately.

OBJECTS AND SUMMARY OF THE INVENTION

It is one object of this invention to provide an improved apparatus for reproducing first and second video signals from a magnetic tape.

It is another object of this invention to provide a novel apparatus for reproducing first and second video signals from a magnetic tape capable of accurately changing over the circuit constants even when a dropout occurs or a noise is mixed into the video signal.

According to one aspect of the present invention, there is provided an apparatus for reproducing from a magnetic tape first and second video signals which are frequency-modulated on a carrier, said first video signal having the center frequency of said carrier lower than that of said second video signal, comprising:

means for demodulating said first and second video signals;

a first low-pass filter for filtering said first video signal demodulated by said demodulating means, said first low-pass filter having a first cut-off frequency;

a second low-pass filter for filtering said video signal demodulated by said demodulating means, said second low-pass filter having a second cut-off frequency which is lower than said first cut-off frequency;

means connected prior to said demodulating means for detecting whether a reproduced video signal is said first or second video signal and for generating a control signal in response thereto; and switching means for selectively supplying the output signals of said first and second low-pass filters to an output terminal in accordance with said control signal from said detecting means.

According to another aspect of the present invention, there is provided an apparatus for recording and reproducing a video signal comprising:

first modulating means for frequency modulating a video signal with a first frequency carrier;

second modulating means for frequency-modulating said video signal with a second frequency carrier;

recording means for recording said video signal frequency-modulated by said first or second modulating means on a magnetic tape;

reproducing means for reproducing said video signal recorded on said magnetic tape;

detecting means for detecting whether said video signal reproduced from said magnetic tape is frequency-modulated with said first frequency carrier or with said second frequency carrier, and for generating a control signal; and first switching means for selectively activating said first and second modulating means in accordance with said control signal, a frequency of said carrier used in recording subsequent to reproducing being coincident with a frequency of said carrier used in said reproducing.

These and other objects, features and advantages of the VTR according to the present invention will become apparent from the following detailed description of the preferred embodiments taken in conjunction with the accompanying drawings, throughout which like reference numerals designate like elements and parts.

BRIEF DESCRIPTION OF THE DRAWINGS

FIGS. 12A and 12B respectively illustrate diagrams useful for explaining another operation of this invention; and FIG. 13 illustrates a systematic block diagram showing another embodiment of the VTR according to this invention.

DESCRIPTION OF THE PREFERRED EMBODIMENTS

Figure 3:
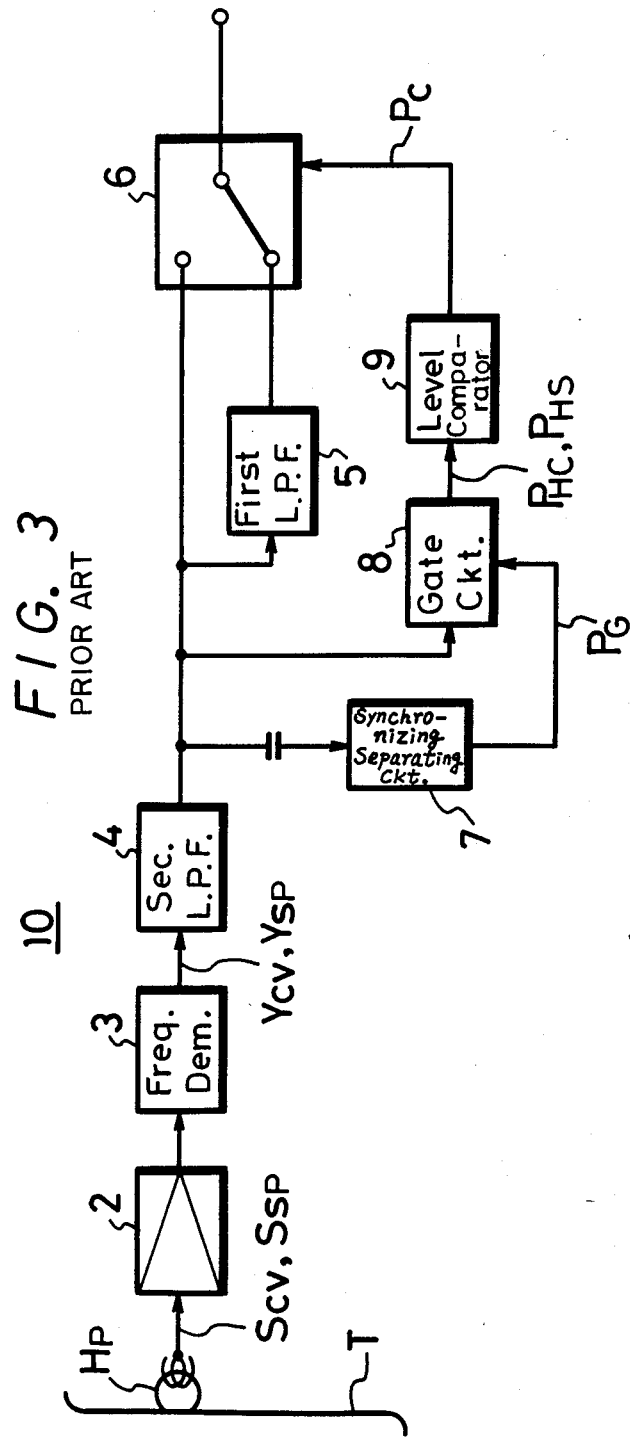
FIG. 3 illustrates a systematic block diagram of a reproducing system of a prior art video tape recorder useful for explaining this invention.
Figure 4:
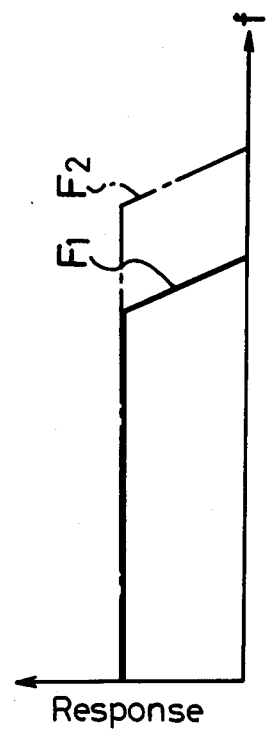
FIGS. 4 to 6 illustrates diagrams useful for explaining the operation thereof, respectively.
Figure 7:
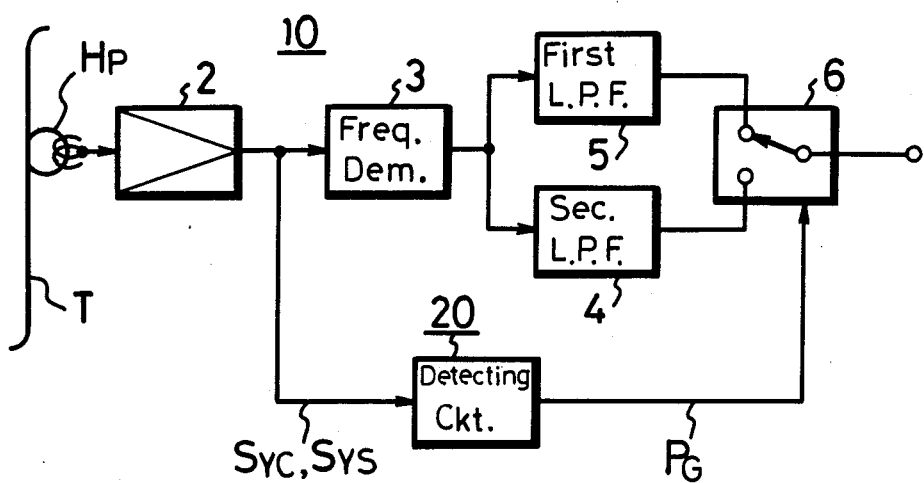
FIG. 7 illustrates a systematic block diagram of an embodiment of the video tape recorder according to this invention.

Now, an embodiment of the VTR according to this invention will hereinafter be described in detail with reference to FIG. 7 and the followings. In FIG. 7, like parts corresponding to those of FIG. 3 are marked with the same reference numerals and will not be described in detail.

In FIG. 7, reference numeral 20 designates a detecting circuit which is supplied with the first or second color video signal $S_{CV}$ or $S_{SP}$ before being demodulated, in this embodiment, particularly the frequency-modulated luminance signal $S_{YC}$ or $S_{YS}$ and the detected output therefrom is supplied to the switching circuit 6 as the gate pulse $P_G$ thereof.

Figure 9:
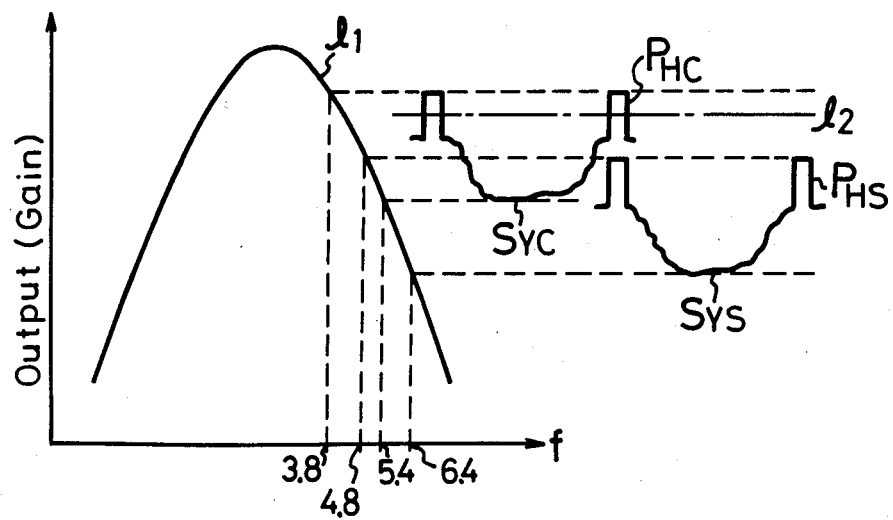
FIG. 9, FIGS. 10A to 10F and FIGS. 11A to 11C respectively illustrate diagrams useful for explaining the operation thereof.
Figure 8:
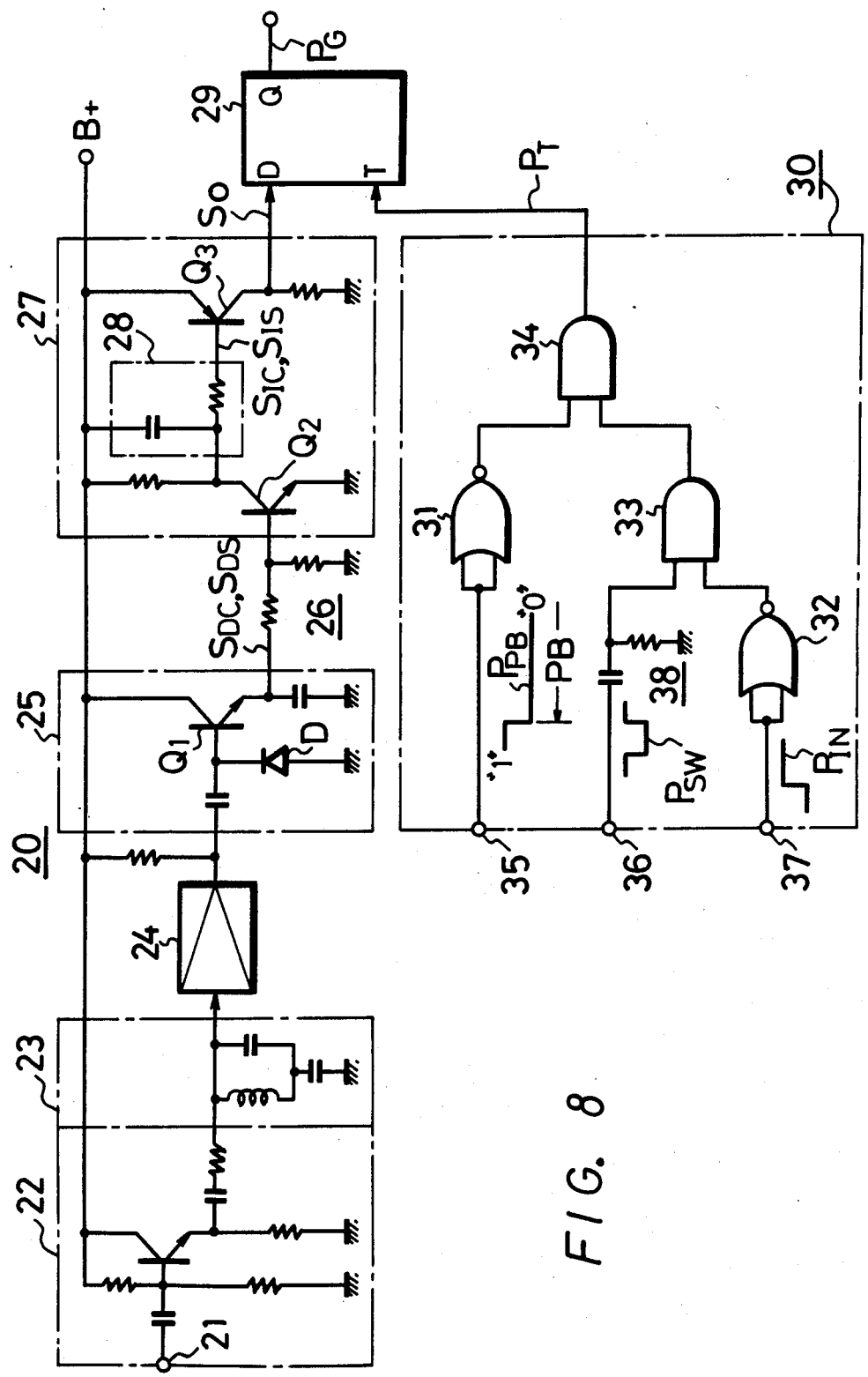
FIG. 8 illustrates a circuit diagram of a detecting circuit used in the embodiment shown in FIG. 7.

FIG. 8 shows an example of the detecting circuit 20. Referring to FIG. 8, the first or second luminance signal $S_{YC}$ or $S_{YS}$ applied to a terminal 21 is supplied through a buffer amplifier 22 to a filter 23. As the filter 23, an LC filter having a high Q (quality)-factor is used and this filter 23 has a characteristic of a single peak (or single bottom) as shown by a curve $l_1$ in FIG. 9. Therefore, if the filtered output from this filter 23 is supplied to an amplifier 24, the amplifier 24 produces an output with different levels on the basis of the difference of the deviation frequencies as shown in FIG. 9. In the illustrative example, the level of the first luminance signal $S_{YC}$ is higher than that of the second luminance signal $S_{YS}$ ($S_{YC} > S_{YS}$).

Figure 10A:
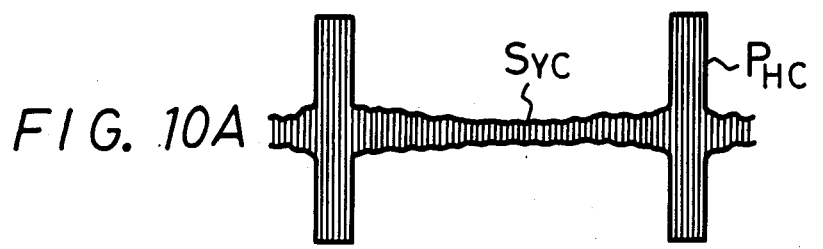
Figure 10B:
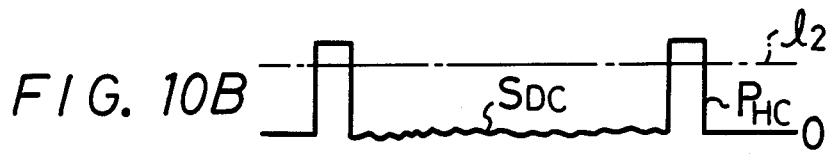

FIG. 9 shows the waveforms of the frequency modulated luminance signals $S_{YC}$ and $S_{YS}$ in the form of the FM demodulated output signals for convenience sake of explanation. However, in practice, the frequency modulated luminance signals $S_{YC}$ and $S_{YS}$ are high frequency signals as shown in FIGS. 10A and 10D.

The output from the amplifier 24 is detected by a detector circuit 25 which is formed of mainly a transistor Q1 and a diode D. When the first luminance signal $S_{YC}$ as shown in FIG. 10A is supplied to the detecting circuit 20, a detected output $S_{DC}$ obtained at the emitter of the transistor Q1 becomes as shown in FIG. 10B. This detected output $S_{DC}$ is divided in voltage by a resistance type voltage dividing circuit 26 and then fed to a transistor Q2 which constitutes a level detecting circuit 27. Accordingly, when the level of the divided output is higher than that of the base-emitter voltage $V_{BE}$ of the transistor Q2, the transistor Q2 is turned on. Consequently, the voltage dividing ratio is selected so as to turn on the transistor Q2 only when the detected output $S_{DC}$ based on the first luminance signal $S_{YC}$ is produced.

FIGS. 9 and 10B respectively illustrate a level $l_2$ which enable the transistor Q2 to turn on and which is the level of the detected output $S_{DC}$ converted before being divided.

Figure 10C:
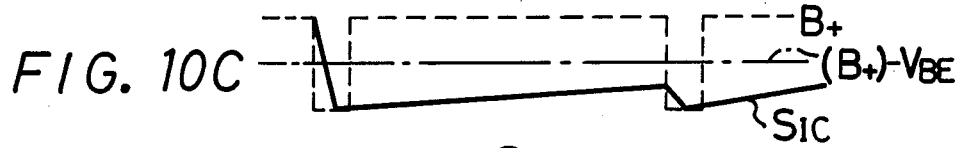
Figure 10D:
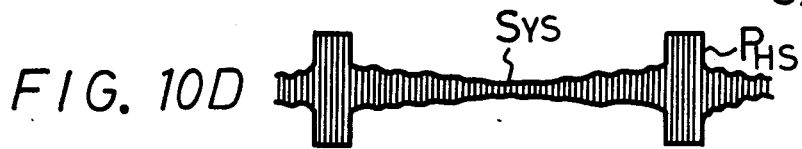

The collector output of the transistor Q2 becomes as shown by a broken line in FIG. 10C. When this collector output is supplied to an integrating circuit 28, an integrated output $S_{IC}$ of off-delay as shown in FIG. 10C is obtained therefrom. This integrated output $S_{IC}$ is the output near the DC voltage. The integrated output $S_{IC}$ is supplied to a PNP-type transistor Q3 and compared in level with a reference level. Since the reference level is presented as (B+) $-V_{BE}$ (B+ is the power source voltage and $V_{BE}$ is the base-emitter voltage of the transistor Q3), when the level of integrated output $S_{IC}$ is not higher than the reference level, the transistor Q3 is turned on to make its collector output $S_{OC}$ become "H". In the afore-said case, the absolute value of the integrated output $S_{IC}$ is so small as to turn on the transistor Q3.

Figure 10E:
Figure 10F:
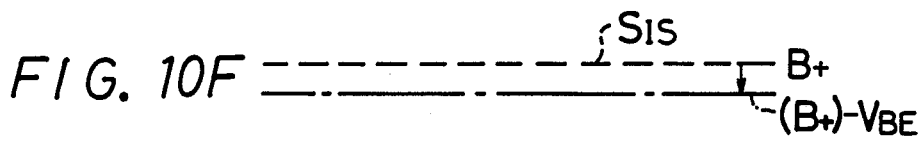

In the case of the second luminance signal $S_{YS}$, on the contrary, the peak level of the detected output $S_{DS}$ is small (FIG. 10E) so that if this detected output $S_{DC}$ is divided in voltage, the level thereof can not exceed the base-emitter voltage $V_{BE}$ of the transistor Q2 and hence the collector output of the transistor Q2 holds the level of the power source voltage. As a result, since the integrated output $S_{IC}$ is equal to the power source voltage B+, the transistor Q3 is not turned on and hence the collector output $S_{OS}$ thereof is at "L".

Accordingly, in the case that an input signal is the first color video signal $S_{CV}$, the level detected output (the collector output of the transistor Q3) is "H", while in the case that an input signal is the second color video signal $S_{SP}$, the level detected output becomes "L". The level detected outputs $S_{OC}$ and $S_{OS}$ are supplied to a D terminal of a D-type flip-flop circuit 29. The D-type flip-flop circuit 29 is controlled in its latching an input to its D terminal by an output or trigger pulse $P_T$ from a control circuit 30.

The control circuit 30 for producing the trigger pulse $P_T$ consists of a pair of NOR gates 31 and 32 and a pair of AND gates 33 and 34, in which a mode pulse $P_{PB}$ that is obtained in the playback mode of the apparatus, is supplied to a terminal 35. This mode pulse $P_{PB}$ is supplied through the NOR gate 31 to the AND gate 34 and the mode pulse $P_{PB}$ is at "L" in the playback mode.

Figure 11A:
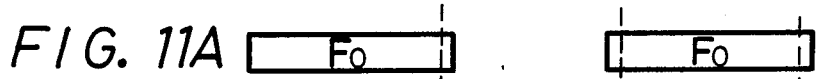
Figure 11B:
Figure 11C:

A switching pulse $P_{SW}$ for use in selectively switching the magnetic held is supplied to a terminal 36 of the control circuit 30 and this switching pulse $P_{SW}$ is differentiated by a differentiating circuit 38 and then supplied through the AND gate 33 to the AND gate 34. The switching pulse $P_{SW}$ is used to alternatively select the odd field $F_O$ and the even field $F_E$ as shown in FIGS. 11A and 11B so as to form a successive reproduced signal.

A mode pulse $P_{IN}$ which becomes at "H" in the insert edition mode is supplied a terminal 37 of the control circuit 30. This mode pulse $P_{IN}$ is supplied through the NOR gate 32 to the AND gate 33.

Accordingly, the playback mode, the level of the mode pulse $P_{PB}$ is "L" and that of the mode pulse $P_{IN}$ is "L" so that only when the switching pulse $P_{SW}$ rises, the outputs of the AND gates 33 and 34 both become "H" in level thereby producing the trigger pulse $P_T$. As a result, the input signal is latched in the D terminal of the D type flip-flop circuit 29 at a timing when the trigger pulse $P_T$ is produced.

Figure 2:
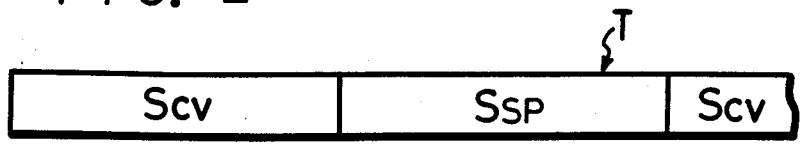
FIG. 2 illustrates an example of a recorded pattern of a video information on a magentic tape.

As described above, in the playback mode, one level detected output $S_O$ is latched in the flip-flop circuit 29 at every rotation of the magnetic head and the level detected output $S_O$ of "H" or "L" level thus latched is used as a gate pulse (the detected output) $P_G$. In consequence, when the recording tape T as shown in FIG. 2 is reproduced, the first color video signal $S_{CV}$ is reproduced firstly so that the level detected output $S_O$ of level "H" at that time is supplied to the switching circuit 6 as the gate pulse $P_G$ and hence the first low-pass filter 5 is selected. When the second color video signal $S_{SP}$ comes to be reproduced, the second detected output $S_{DS}$ is continuously obtained immediately after the playback of the first odd field $F_O$ so that the level detected output $S_O$ becomes "L". As a result, as the next timing for changing over the magnetic head, the level detected output $S_O$ of level "L" is latched in the D-type flip-flop circuit 29 so that the gate pulse $P_G$ is changed from "H" to "L" in level, thereby operating the switching circuit 6 so as to select the second low-pass filter 4.

When the detecting circuit 20 is constructed as described above, the horizontal synchronizing pulse after being demodulated is not used to form the gate pulse $P_G$ so that the switching circuit can stably be operated regardless of the dropout and the noise.

According to this invention, the gate pulse $P_G$ is formed on the basis of the color video signal before being demodulated so that even if the FM carrier is temporarily dropped due to the dropout, the detected outputs $S_{DC}$ and $S_{DC}$ are not changed so much. If the filter 23 is designed to have a high Q-factor, the FM carrier itself is very small in amount as shown in FIG. 10A or 10D, so that the detected outputs $S_{DC}$ and $S_{DS}$ are hardly changed substantially. Thus, it can be avoided that the switching operation of the switching circuit will be made unstable by the dropout.

Further, since the noise can be removed by the integrating circuit 28, the switching circuit is free of the influence of the noise.

In addition, in the embodiment shown in FIG. 8, the control circuit 30 is provided such that the level detected output $S_O$ is once latched in the flip-flop circuit 29 at every frame so that in association with the above-mentioned circuit arrangement, it is possible to reduce a probability of influence being exerted by the dropout and the noise very much.

Since the control circuit 30 is supplied with the mode pulse $P_{IN}$ which is obtained in the insert mode edition, when this invention is applied to a VTR capable of the insert mode edition, the trigger pulse $P_T$ is not obtained in the insert mode and hence the D-type flip-flop circuit 29 latches therein the preceding data.

Figure 5:
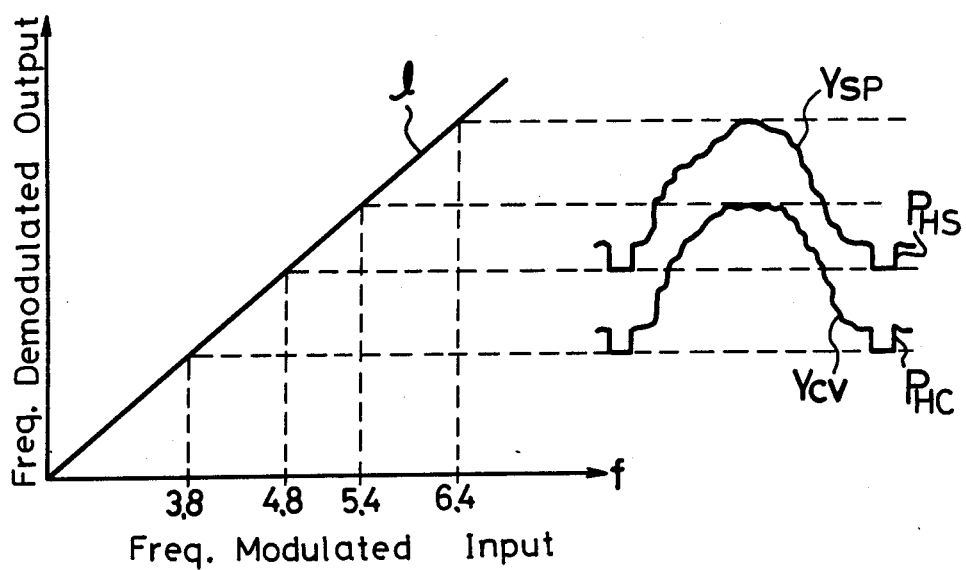
Figure 6:
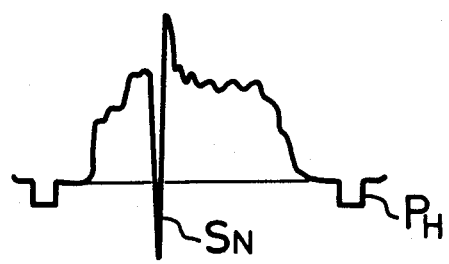

In insert edition mode, instead of the first color video signal $S_{CV}$, the second color video signal $S_{SP}$ is occasionally inserted into a predetermined interval of the tape T on which the first color video signal $S_{CV}$, for example, is recorded (see FIG. 12A). If the second color video signal $S_{SP}$ having the different deviation frequency is inserted as mentioned above, by the demodulation characteristic as shown in FIG. 5, the demodulated output is fluctuated much at the insertion portion (see FIG. 12B). Thus, the picture is disturbed at the above-mentioned inserted portion.

Such edition must be avoided. Therefore, in such insert edition mode, it is desired to inhibit the edition from being carried out under the state of the second color video signal $S_{SP}$.

To this end, in the reproducing system 10, when the mode pulse $P_{IN}$ becomes level "H", even if the switching pulse $P_{SW}$ is supplied the control circuit 30, the AND gate 33 is inhibited from producing the output and the AND circuit 34 is inhibited from sending the trigger pulse $P_T$, thus the data latching operation of the D-type flip-flop circuit 29 is inhibited. Thus, even if the level detected output $S_O$ becomes level "L", the D-type flip-flop circuit 29 is inhibited from latching therein the level detected output, thereby the state of the switching circuit 6 being not switched.

While the state of the switching circuit 6 is held the recording system is desired to change the deviation frequency of a frequency modulator provided therein into such one for use in the first color video signal $S_{CV}$. Accordingly, the recording system is constructed as shown in FIG. 13.

In FIG. 13, reference numeral 40 designates a recording system, in which a luminance signal Y is frequency-modulated by a frequency modulator 42 and then mixed with a low frequency-converted chrominance subcarrier signal (not shown), when then is supplied through a recording amplifier 43 to a magnetic recording head $H_R$.

In the insertion edition mode, the VTR is changed into the mode in which a color video signal that should be recorded can directly be monitored not through the tape recording-reproducing system, namely, a so-called E - E mode. For this reason, the reproducing system 10 is provided with a mode change-over switch 44 and the output from the pre-amplifier 2 and the output from the recording amplifier 43, in this embodiment, are automatically changed by this mode change-over switch 44.

The frequency modulator 42 is provided with a control switch 45 so as to change the frequency modulated deviation frequency and this control switch 45 is controlled automatically by the gate pulse $P_G$ which is obtained in the insert edition mode.

Figure 1A:
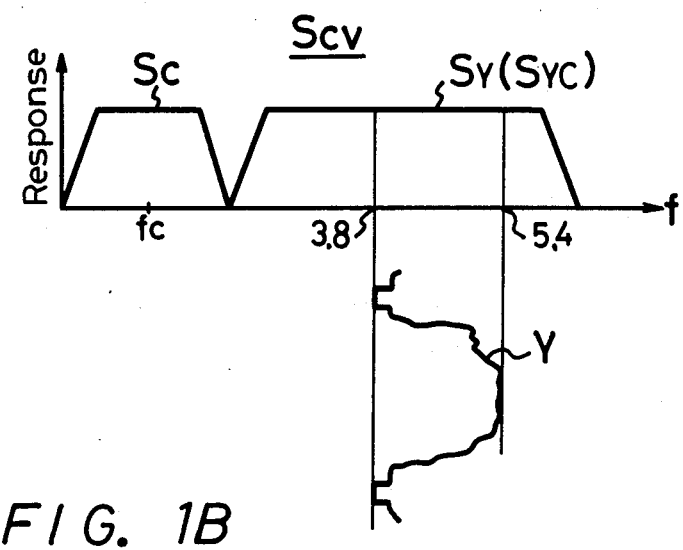
FIGS. 1A and 1B illustrate frequency spectrum diagrams of color video signals useful for explaining this invention, respectively.
Figure 1B:
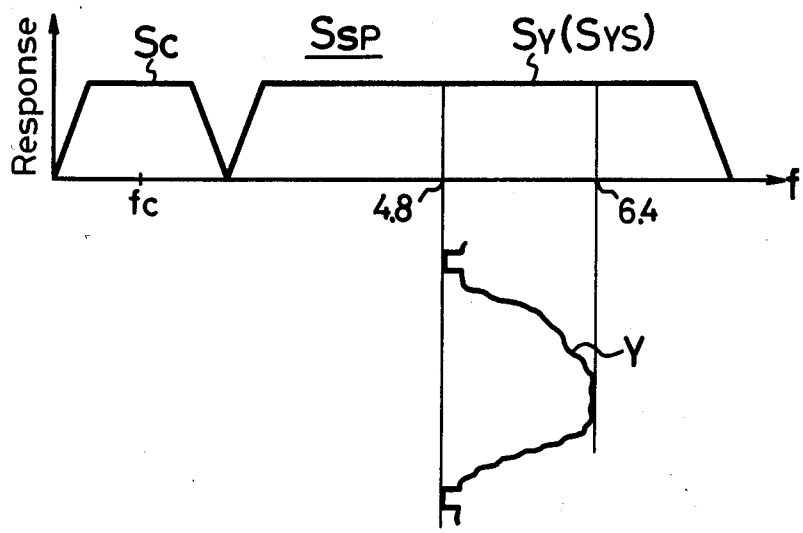

Here, when the reproduced information before an insert start point is the first color video signal $S_{CV}$, the movable contact of the control switch 45 is compulsorily changed in position to the contact a by the gate pulse $P_G$ as shown in FIG. 13, so that the first color video signal $S_{CV}$ is recorded after an insert point even if the second color video signal $S_{SP}$ is to be inserted. Thus, the luminance signal Y is frequency-modulated by the deviation frequency shown in FIG. 1A. Thus, in insert edition mode, the first color video signal $S_{CV}$ is always recorded on the recording tape.

When the first color video signal $S_{CV}$ is to be inserted into the tape at its portion in which the second color video signal $S_{SP}$ is recorded as the recorded information, the reverse operation is carried out. Also in this case, the control switch 45 is changed automatically to forcibly establish the insert edition mode of the second color video signal $S_{SP}$.

As set forth above, according to this invention, since the gate pulse $P_G$ is formed on the basis of the frequency-modulated luminance signal $S_Y$, even when the dropout occurs and the noise is mixed thereto, the switching operation becomes stable and hence the switching operation of the circuit constants can be carried out accurately.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. Apparatus for reproducing from a magnetic tape a recorded video signal which is one of first and second video signals which have been frequency-modulated on first and second carriers, respectively, said first carrier having a frequency lower than that of said second carrier, comprising:

means for demodulating a video signal reproduced from said tape to provide a demodulated video signal;

first low-pass filter means having a first cut-off frequency for filtering said demodulated video signal;

second low-pass filter means having a second cut-off frequency higher than said first cut-off frequency for filtering said demodulated video signal;

means connected before said demodulating means and responsive to the reproduced video signal before demodulation for detecting whether the reproduced video signal is said first or second video signal and for generating a control signal in response thereto, said detecting means including third filter means having an amplitude response which monotonically increases or decreases at least in a frequency range between a lower limit frequency of said first video signal and an upper limit frequency of said second video signal for producing an output signal, and level detecting means for detecting a level of the output signal from said third filter means; and switching means for selectively supplying the filtered demodulated video signal from one of said first and second low-pass filter means to an output terminal in accordance with said control signal from said detecting means.

2. Apparatus according to claim 1, wherein said level detecting means includes comparator means for comparing the level of said output signal from third filter means with a predetermined level.

3. Apparatus according to claim 2, wherein said predetermined level is selected to lie between horizontal synchronizing tip levels of said first and second video signals.

4. Apparatus according to claim 1, wherein said first and second video signals include luminance signals.

5. Apparatus according to claim 1, wherein said amplitude response to said third filter means has a characteristic of a single peak.

6. Apparatus according to claim 1, wherein said amplitude response of said third filter means has a characteristic of a single minimum.

7. Apparatus for recording and reproducing a video signal comprising;

modulating means actuable for frequency modulating a video signal on a selected one of a first carrier having a first frequency and a second carrier having a second frequency;

recording means for recording said video signal frequency-modulated on said first or second carrier on a magnetic tape;

reproducing means for reproducing said video signal recorded on said magnetic tape;

means for demodulating said video signal reproduced from said magnetic tape;

detecting means responsive to the reproduced video signal before demodulation for detecting at a selected time upon which of said first and second carriers said video signal reproduced from said magnetic tape is frequency-modulated, and for generating a control signal in response thereto;

first low-pass filter means having a first cut-off frequency for filtering said demodulated signal to provide a first filtered video signal;

second low-pass filter means having a second cut-off frequency higher than said first cut-off frequency for filtering said demodulated video signal to provide a second filtered video signal;

first switching means for selectively actuating said modulating means in accordance with said control signal to select said detected carrier as said selected carrier to be used in said modulating means for recording subsequent to said selected time; and second switching means for selectively supplying one of said first and second filtered video signal to an output terminal in accordance with said control signals from said detecting means.

said detecting means including third filter means having an amplitude response which monotonically increases or decreases at least in a frequency range including frequencies of said video signal as frequency-modulated by said modulating means on each of said first and second carriers to provide an output signal, and level detecting means for detecting a level of the output signal from said third filter means.

8. Apparatus according to claim 7, wherein said level detecting means includes comparator means for comparing the level of said output signal from said third filter means with a predetermined level.

9. Apparatus according to claim 8, wherein said predetermined level is selected to lie between horizontal synchronizing tip levels of said video signal as frequency-modulated on each of said first and second carriers by said modulating means.

10. Apparatus according to claim 7, wherein said video signal includes a luminance signal.

11. Apparatus according to claim 7, wherein said amplitude response of said third filter means has a characteristic of a single peak.

12. Apparatus according to claim 7, wherein said amplitude response to said third filter means has a characteristic of a single minimum.

* * * * *